United States Patent [19]

Hui et al.

[11] Patent Number: 4,660,170

[45] Date of Patent: Apr. 21, 1987

[54] SYSTEM FOR PROVIDING REPROGRAMMING DATA TO AN EMBEDDED PROCESSOR

[75] Inventors: Kenneth H. Hui, Duarte; King C. Mak, Alhambra; David G. Hardesty, San Dimas, all of Calif.

[73] Assignee: General Dynamics, Pomona Division, Pomona, Calif.

[21] Appl. No.: 728,621

[22] Filed: Apr. 29, 1985

[51] Int. Cl.[4] .............................................. G06F 1/00
[52] U.S. Cl. .................................................... 364/900
[58] Field of Search ... 364/200 MS File, 900 MS File, 364/147

[56] References Cited

U.S. PATENT DOCUMENTS

| 3,944,984 | 3/1976 | Morley et al. | 364/900 |
| 3,975,712 | 8/1976 | Hepworth et al. | 340/147 R |
| 4,006,457 | 2/1977 | Hepworth et al. | 340/147 R |
| 4,063,311 | 12/1977 | Jeremiah et al. | 364/900 |
| 4,254,475 | 3/1981 | Cooney et al. | 364/900 |
| 4,404,625 | 9/1983 | Saito et al. | 364/144 |

FOREIGN PATENT DOCUMENTS

2054909 7/1979 United Kingdom .

Primary Examiner—Raulfe B. Zache
Attorney, Agent, or Firm—Neil F. Martin; Terrance A. Meador; Edward B. Johnson

[57] ABSTRACT

A system for providing information to alter the software of an electronic data processor embedded in an electronic module includes a remote reprogramming module that conducts a sequence of operations to provide data to the processor which the processor uses to reprogram itself. The system employs a data link having a bi-directional transmission path connecting the processor and the reprogramming module. A controlled switching circuit is provided at each end of the transmission path. Under normal operating conditions, the transmission path is used to transit a function signal for a function performed by the electronic module. Periodically, the processor operates one switching network to capture the path for transmission of a reprogramming inquiry signal to the reprogramming module. At the same time, the function signal is diverted to an alternate path internal to the electronic module. When the reprogramming module detects a reprogramming inquiry, it operates the other switching circuit to gain access to the transmission path. Then, in response to commands from the processor, the reprogramming module undertakes the reprogramming sequence and transfers data to alter program information held in the memory of the processor. Thereafter, both the processor and the reprogramming module operate their respective switching circuits to restore the transmission path to its normal operational use for the transmission of the function signal.

25 Claims, 14 Drawing Figures

| TEST CODE | BLOCK 1 START ADDRESS | PROCESSOR 32 INITIAL STORAGE ADDRESS | BLOCK 1 SIZE | ... |
|---|---|---|---|---|
| BYTE 2 | BYTE 4 | BYTE 6 | BYTE 8 | BYTE 20 |

SYSTEM FOR PROVIDING REPROGRAMMING DATA TO AN EMBEDDED PROCESSOR

BACKGROUND OF THE INVENTION

The system of the invention is in the field of reprogramming systems that are used to provide data for altering or modifying program information stored in the memory of a programmed processor.

In the development of modern weaponry, the use of microprocessors to enhance the operation and performance of launched weapons is well known. For example, the increasing capacity of modern microprocessors to quickly and accurately perform complex tasks has led to the provision of processor-based guidance capability in weapons (such as missiles) that are aimed and fired at a target.

However, it is usually the case that each increment of operational ability provided to a weapon through the use of sophisticated electronics stimulates a corresponding increment in the threat which the weapon must meet. Thus, the margin of effectiveness enjoyed by a weapon as a result of a change to its internal electronics is often fleeting.

In the past, when a weapon's improved effectiveness was countered by an improvement to the technology of its intended target, the weapon was either altered or discarded and replaced. Alteration of a weapon incorporating electronics can often involve redesign and replacement of electronic circuitry. However, the advent of microprocessor-based weaponry facilitates the modification of a weapon's operation to meet a change in countervailing technology. For example, modification of a weapon's operation, guidance policy, or sensor spectrum can be accomplished by alteration of the implementing software.

Many microprocessor-based weapons that are currently deployed were not designed to be easily reprogrammed. In order to alter their programs, these weapons must be returned to a high maintenance echelon, where they are disassembled and reprogrammed. This results in an addition to the total lifetime cost of such weapons and reduces the readiness of the military units from which the weapons are removed for alteration.

It would therefore be advantageous to provide a system for adapting a microprocessor-based weapon to be reprogrammed in the field in a manner which does not require physical intrusion into the weapon, and which limits the margin of cost added to the lifetime cycle costs of the weapon.

SUMMARY OF THE INVENTION

The present invention overcomes the disadvantages of prior microprocessor-based weapons by providing data useful for amending a program in a self-programmable processor contained in a weapon module that has a plurality of active signal paths for conducting signals between the interior and exterior of the weapon. The system includes a terminal unit in the weapon module that is responsive to a switch command from the programmable processor for connecting the processor to one of the signal paths that conducts a function signal.

A reprogramming module outside the weapon includes a signal path access switch that is switchably connected to the signal path to unidirectionally conduct signals from the signal path without interrupting conduction of the function signal.

A reprogramming controller in the reprogramming module is connected to receive the unidirectionally conducted signals from the signal path access switch. The reprogramming controller responds to a received signal that corresponds to a reprogramming inquiry command sequence from the programmable processor by disconnecting the access switch from the signal path and producing a second switch command.

A switching circuit in the reprogramming module responds to the second switch command by connecting the reprogramming controller to the signal path.

Finally, the reprogramming controller has a reprogramming circuit for, when the reprogramming controller is connected to the signal path, providing a sequence of reprogramming data signals to the reprogrammable processor over the captured signal path.

Once the transfer of reprogramming data is complete, the self-programmable processor can implement a reprogramming routine in its operation program to alter its own software, using the data transferred to it by the system of the invention.

Therefore, the structure of the system of the invention permits reprogramming of a microprocessor-based weapon at the lowest possible maintenance echelon by providing a reprogramming data transfer function that can be automatically implemented by a weapons operator in the field without physically intruding into the weapon. Further, the system uses existing weapon signal pathways to accomplish the data transfer, thus avoiding the need to structurally alter the weapon by providing additional dedicated pathways for transferring reprogramming data.

It is therefore the principal object of the present invention to provide a system for non-intrusively enabling the alteration or change of the program of a self-programmable assembly contained in an electronic module.

A further object of the present invention is to provide such a system that operates using preexisting signal pathways in the module.

Yet another object of this invention is to permit the simple transfer of reprogramming data to a self-programmable processor from a remote location using an existing data pathway.

The invention has as still another objective to provide a multi-use data path that is dedicated to a preferred normal communication usage but which permits the assertion of a temporary alternative communication usage without interrupting the normal usage.

Further objects and other attendant advantages of the present invention will become more evident when the following detailed description is read in light of the below-described drawings, in which like reference numerals indicate like elements.

DETAILED DESCRIPTION OF THE PREFERRED EMBODIMENT

Figure 1:
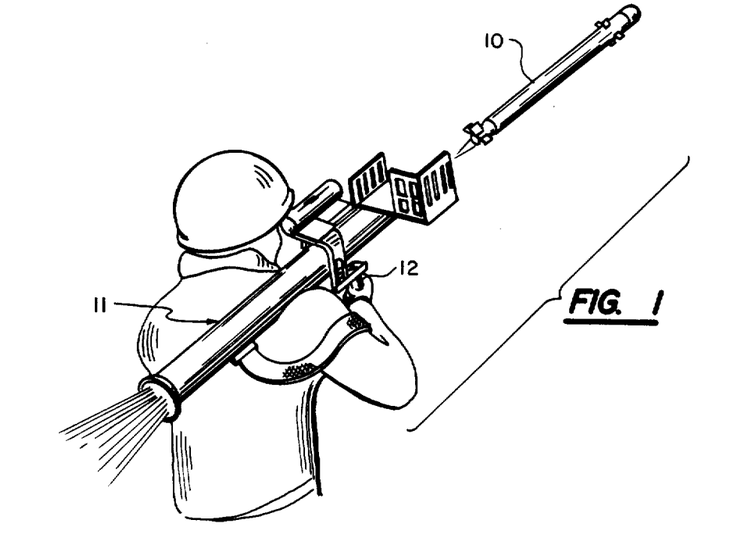
FIG. 1 illustrates a shoulder-fired guided missile having a microprocessor-based guidance system.

FIG. 1 illustrates a shoulder-fired missile 10 including a microprocessor-based system that controls target acquisition and guidance of the missile. Prior to firing, the missile is held in a launching assembly 11 that enables a Marine or a soldier to shoulder the missile for aiming, target acquisition, and launching to target. The shoulder launching assembly includes a gripstock 12 having a trigger that is pulled when the missile is to be launched.

Since the missile of FIG. 1 is fully portable it can be transported to different portions of a battlefield where different enemy threats prevail. In order to flexibly respond to different threats, the system of the invention provides to the operator the opportunity to insert a reprogramming module included in the system of the invention into a receptacle in the gripstock so that the acquisition and guidance method of the microprocessor in the missile can be changed to accommodate the change in threats.

An exemplary microprocessor-based missile system corresponding to the missile of FIG. 1 is the STINGER missile that is manufactured by the assignee of this patent application.

Figure 2:
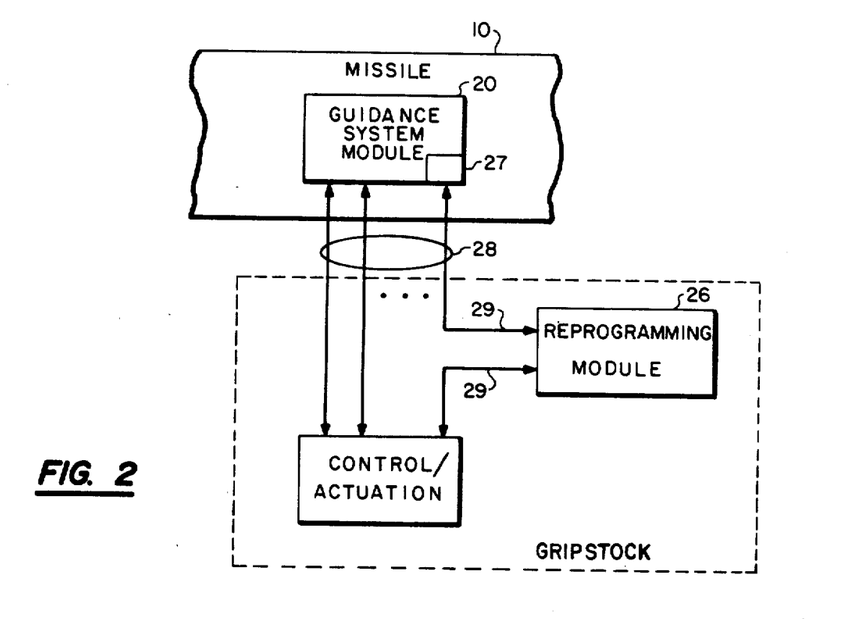
FIG. 2 is a block diagram representing the general relation between the system of the invention and electronic circuitry in the missile of FIG. 1.

FIG. 2 shows the arrangement of parts of the system of the invention as they are employed with the missile of FIG. 1 in a battlefield. In FIG. 2, the missile 10 has a guidance system module 20 including a processor system for implementing the guidance policy of the missile through the execution of a stored processor program. The guidance processor is conventional in that it includes interconnected processing, addressing, and interfacing circuitry together with memory circuitry for storing an operational program that includes target acquisition and guidance procedures. Such memory circuitry preferably includes circuitry that holds program instructions in addressable locations and that is responsive to memory read and write operations.

Since the memory circuitry of the guidance system processor in the missile 10 responds to write as well as to read operations performed by the CPU (central processing unit) of the processor, the program instructions that it contains can be altered by the CPU executing a series of write cycles in which new program instructions are entered into the circuitry. A sequence of such write operations that alter a block of program instructions in a software module constitutes reprogramming.

The guidance processor obtains the data necessary to reprogram itself from the system of the invention. Once obtained, the data is used by the processor in a conventional reprogramming operation (not described herein) to alter various predetermined portions of its operation program.

The data to be entered during reprogramming memory write operations is obtained by the guidance system processor from the system of the invention in a sequence of data transfer operations which is called a reprogramming sequence. After (or during) the transfer of reprogramming data from the system, the processor executes conventional instruction sequences to appropriately write the data to memory.

Transfer of reprogramming information to the guidance system processor is accomplished by the reprogramming data transfer system of the invention, which includes a reprogramming data module 26 and a processor terminal unit 27, illustrated in FIG. 2. Included in the missile system is a communications cable 28 containing a plurality of signal paths that are used to conduct signals between control circuits and actuators in the gripstock 12 of the missile launcher and the missile electronics. One such signal path is a bi-directional signal line 29 that passes through the reprogramming data module 26 when the module is installed in the gripstock 12.

Figure 3:
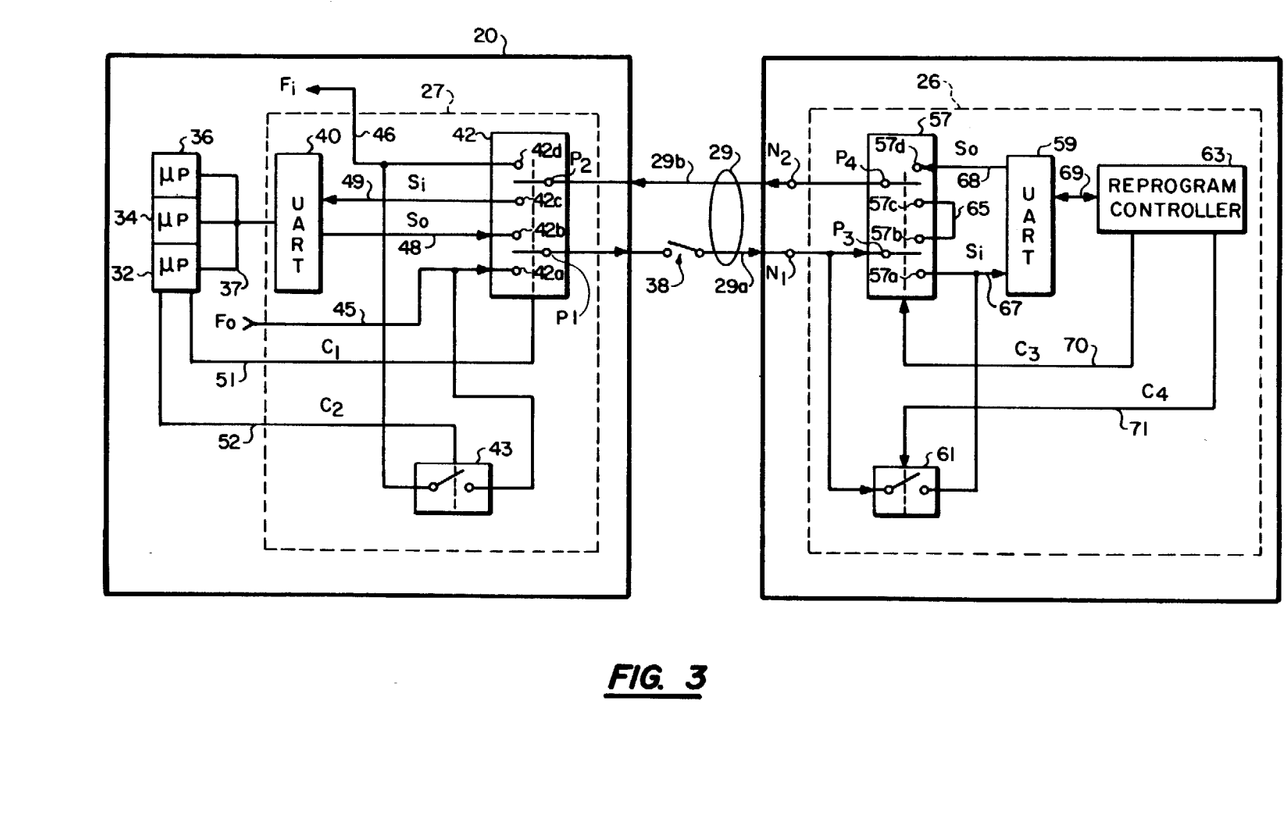
FIG. 3 is a block diagram of the system of the invention.

Reference to FIG. 3 provides a clearer understanding of the reprogramming data transfer system of the invention and how it is linked to provide reprogramming information to processing circuitry in the guidance module 20 contained in the missile 10. In FIG. 3 the guidance system processing circuitry includes three microprocessors 32–36, referred to collectively as the guidance processor, linked together by a common databus 37. As is conventional, the microprocessors 32–36 each have associated programmable memory circuitry, not shown, into which reprogramming data can be entered by conventional write operations. The bi-directional signal path 29 includes a pair of oppositely-directed, unidirectional signal paths 29a and 29b. A hand-operated, single-pole, single-throw switch 38 is connected into the signal path 29a. Before the switch 38 is activated, the signal path 29a is continuous. In the guidance system 20 of the missile 10, the signal paths 29a and 29b are shorted together by a jumper in the gripstock 12 when the reprogramming data module 26 is not in place. The jumper is placed between nodes N₁ and N₂.

The normal purpose of signal path 29 is to provide a return pathway to indicate to the guidance system 20 when the operator of the missile 10 has aimed the missile at a target, which is indicated by depressing switch 38. The guidance system 20 senses when the target acquisition is made because an analog function signal $F_o$ output by the guidance system and connected to the signal path 29a is sensed as an input function signal $F_i$ that returns to the guidance system 20 on the signal lead 29b.

In the normal operation of the guidance system 20, the function signal $F_o$ is generated in the guidance system 20 by means not illustrated in FIG. 3 and is output on the signal line 29a which is connected to the return signal line 29b in the gripstock 12. The function signal returns to the guidance system 20 on signal line 29b, as $F_i$ whose presence is periodically sensed by other means, not shown, in the guidance system 20. When the operator of the missile spots a target to be intercepted by the missile, the operator will depress the switch 38, opening the line 29a and preventing the input function signal $F_i$ from being returned to the guidance system 20. If means in the guidance system fail to detect the input function signal for a certain period of time, the guidance system will undertake procedures to acquire the target, set the initial guidance equations, and propel the missile from the launcher toward the target.

In its preferred embodiment, the system of the invention is permitted to use the bi-directional function signal path comprising the signal lines 29a and 29b to undertake a reprogramming operation. Use of the function signal path is allocated to the system of the invention by the provision of means in the guidance processor to periodically assert control over the signal path while actuating an alternate means of conducting the function signal during the reprogramming sequence.

The means to accomplish these objectives is provided by the terminal unit 27 that resides in the missile guidance system 20. As illustrated in FIG. 3, the terminal unit 27 includes a conventional universal asynchronous receive/transmit device (UART) 40, a two-pole analog switch 42, and a single-pole semiconductor switch 43.

The analog switch 42 includes terminals 42a–42d. Terminals 42a and 42d are connected to signal lines 45 and 46, respectively. Signal line 45 is the internal guidance system signal path for the output function $F_o$, while the path 46 provides internal guidance system conduction for the input function signal $F_i$. Bi-directional data transfer between the switch 42 and the UART 40 takes place on signal lines 48 and 49. The signal line 48 provides an output path for the serial data ($S_o$) that is output by the UART 40. Signal path 49 provides an input path for the serial data ($S_i$) coming into the UART 40. The UART 40 is also connected to the databus 37. The poles of the switch 42, $P_1$ and $P_2$, are connected to signal lines 29a and 29b, respectively.

In operation, the UART 40 conventionally provides a serial-to-parallel and complementary parallel-to-serial staging interface between the guidance system processor databus 37 and signal lines 48 and 49.

In operation, the guidance processor provides reprogramming commands, described later, in parallel to the UART 40. The commands are serialized by the UART and transferred to the reprogramming unit. Reprogramming data is received in serial format by the UART 40 from the reprogramming data module 26, converted to parallel format, and passed, via the data bus, to the guidance processor.

The semiconductor switch 43 of the processor terminal unit is connected between the function signal lines 45 and 46.

Control of the switches 42 and 43 is afforded by control signal lines 51 and 52, with the first control signal $C_1$ provided by the microprocessor 32 to control the setting of the analog switch 42, and a second control signal $C_2$ provided from the same source to control the setting of the switch 43.

The reprogramming data module 26 includes a two-pole analog switch 57 having terminals 57a–57d and pole terminals $P_3$ and $P_4$. The reprogramming data module 26 also includes a conventional UART 59 (equivalent to the UART 40), a passive access switch 61, and a controller 63.

A jumper 65 is connected between the switch terminals 57b and 57c, while a pair of oppositely-directed signal leads 67 and 68 are connected to conduct signals between terminal 57a and the UART 59, and between the UART 59 and the terminal 57d, respectively. The UART 59 and the controller 63 are connected to exchange plural parallel signals on a bi-directional signal interface 69.

In operation, the controller provides reprogramming data, described later, in parallel to the UART 59. The data is serialized by the UART and transferred to the guidance processor. Reprogramming data transfer commands are received in serial format by the UART 59 from the guidance processor converted to parallel format and passed, via the interface 69, to the controller.

The access switch 61 is connected to conduct signals unidirectionally from the signal line 29a to the signal line 67 where they are conducted to the UART 59.

The controller 63 provides a pair of control signals $C_3$ and $C_4$ on signal lines 70 and 71, respectively. The control signal $C_3$ determines the state of the switch 57, while the control signal $C_4$ controls the access switch 61.

In the preferred mode of operation, when the missile is being used by an operator in the field, power is initially provided for all electronic functions of the missile system. Immediately after the system is turned on, the guidance system 20 begins to continually transmit $F_o$ and to sense $F_i$. At the same time, the guidance system processor will periodically attempt to initiate a reprogramming sequence with the reprogramming data module. Since communications for both the function signal and the reprogramming sequence must be conducted on the signal lines 29a and 29b, the initial steps of the reprogramming sequence attempted by the guidance system processor will provide an alternate continuous signal path for the function signal while the reprogramming inquiry is being made. This will prevent a false indication of target acquisition being given to the guidance system during transfer of reprogramming data to the guidance system processor.

Preferably, the reprogramming sequence undertaken by the guidance processor is indifferent, in its initial steps, to whether or not a reprogramming data module has been installed in the gripstock 12.

Figure 4A:
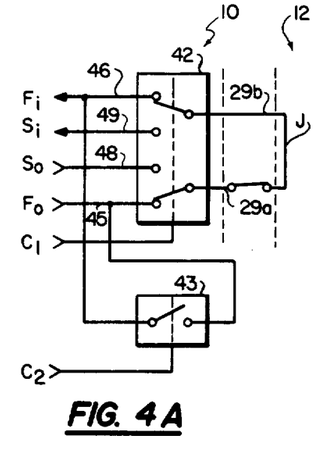
FIGS. 4A and 4B are diagrams illustrating the conditions of a terminal unit contained in the system of the invention when the missile of FIG. 1 is to be used without being reprogrammed.
Figures 4B, 5B, 5C:
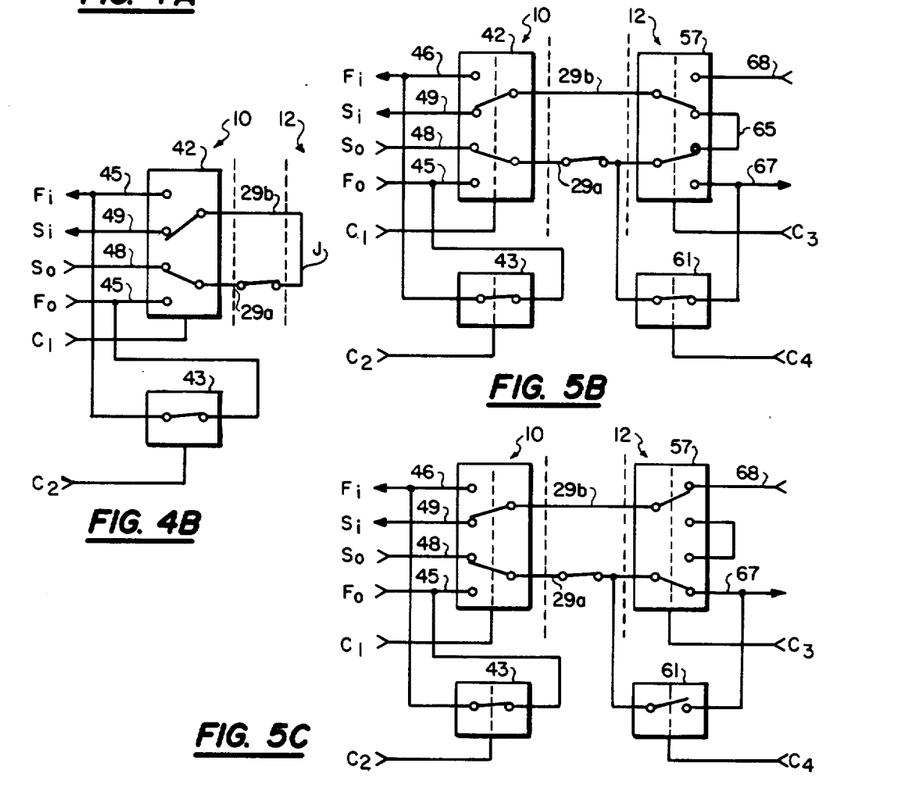
FIGS. 5A–5C illustrate conditions of the terminal unit of FIGS. 4A and 4B and a reprogramming module switching circuit included in the system of the invention when the weapon illustrated in FIG. 1 is to be reprogrammed before firing.

In the event that a reprogramming data module is not installed in the gripstock, the guidance processor executes an initial control signal sequence that results in the terminal unit switches being set in the sequence illustrated in FIGS. 4A and 4B. When the missile system electronics are initially turned on, the guidance processor system provides signals $C_1$ and $C_2$ appropriate to place the switches 42 and 43, respectively, in the states illustrated in FIG. 4A. In FIG. 4A, the switch 42 is set by the guidance processor to connect signal line 45 to signal line 29a and to connect signal line 29b to signal line 46. The signal lines 29a and 29b are connected together by a jumper J in the gripstock that permits $F_o$ to be redirected to the guidance system 20 as $F_i$. At the same time, the switch 43 is held open by the guidance processor.

In an initial loop in the reprogramming operations of the guidance system processor, the processor transmits a digital command sequence that is intended to stimulate a reprogramming data module to initiate a reprogramming sequence. In order to get the message to the reprogramming data module, the guidance processor system sets the switches 42 and 43 to the states illustrated in FIG. 4B. In FIG. 4B, the switch 42 is set to connect the signal line 48 to the signal line 29a and the signal line 29b to the signal line 49. At the same time, the guidance processor closes the switch 43 to provide a return path for the function signal $F_o$. This prevents a false target acquisition indication from being detected by the guidance system while a reprogramming sequence is being conducted.

Upon failing to obtain a response from a reprogramming data module, the guidance processor system will return the switches 42 and 43 to the settings illustrated in FIG. 4A.

Figure 5A:
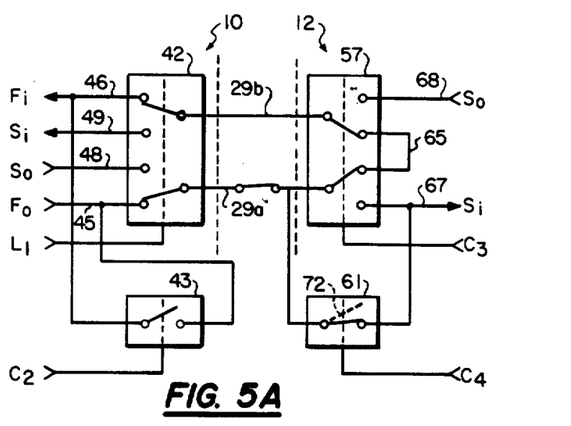

In the event that a reprogramming data module has actually been installed in the gripstock of the missile system, the sequence of switching operations illustrated in FIGS. 5A-5C will result. Initially, when the missile system is first activated, the guidance system processor will set the switch 42 to provide conductivity between signal leads 45 and 29a, and between signal leads 29b and 46. The controller 63 will set the switch 57 to provide a return path for the guidance system function signal through the jumper 65. This permits the guidance system 20 to look for a target acquisition indication from the missile operator. In the initial condition of the complete reprogramming system, illustrated in FIG. 5A, the passive access switch 61 is initially in a state that provides unidirectional conductivity from the signal lead 29a to the reprogramming signal lead 67. This permits the controller 63 to continuously monitor, through the UART 59, the signal line 29a for the presence of a reprogramming inquiry. So long as the function signal $F_o$ is present, the controller 63 takes no action.

The next step, illustrated in FIG. 5B, occurs when the guidance processor sets the processor terminal unit switches so that the internal function signal is routed through the switch 43 and the guidance processor outputs a reprogramming inquiry through the UART 40, and the signal path 48, onto the signal path 29a. The reprogramming inquiry is conducted from the signal line 29a to the reprogramming module signal line 67, and from therethrough the UART 59 to the controller 63.

When the controller 63 detects the presence of a reprogramming inquiry through the access switch 61, it changes the states of the control signals $C_3$ and $C_4$. In response to the changes in $C_3$ and $C_4$, the switches 57 and 61 are placed in the states illustrated in FIG. 5C. As shown in FIG. 5C, a pair of oppositely-directed, unidirectional pathways exist between the guidance processor and the controller 63 over the signal lines 29a and 29b; at the same time, the path between signal paths 29a and 67 is disabled by the open condition of the switch 61. This permits the conduction of a reprogramming sequence involving the transfer of data between these two units that is necessary to reprogram the guidance processor.

When the reprogramming sequence is complete, the guidance processor returns the switches 42 and 43 to the states illustrated in FIG. 5A, while the controller 63 places the switch 57 in the state illustrated in FIG. 5A. Since it is desired in the preferred embodiment to undertake only one complete reprogramming sequence each time a reprogramming module is installed, the access switch 61 is left open (as indicated by the dashed line 72 in FIG. 5A) in order to prevent a subsequent, identical reprogramming sequence before the missile is fired. The switch 61 can only be placed in a conducting state if the gripstock power is turned off, and on again.

The guidance processor initiates, regulates and terminates a reprogramming sequence by means of the commands listed in Table I. The commands represented in Table I consist of conventional 8-bit data words that are transmitted to the reprogramming data module through the data link described above. They are represented in Table I by conventional hexadecimal notation wherein the first hexadecimal digit corresponds to the value of the most significant 4 bits of the command, while the second corresponds to the hexadecimal value of the least significant 4 bits. In Table I X denotes a don't-care condition.

TABLE I

| Commands | Functions |
|---|---|
| 0a | Setup |
| 1a | Latch 4 LSB's (a) of Starting Address |
| 2b | Latch Next 4 Bits (b) of Starting Address |
| 3c | Latch Next 4 Bits (c) of Starting Address |
| 4d | Latch 4 MSB's (d) of Starting Address and Preset Counter to Latched 16 Bit Address |
| 5X | Return to Function Signal Transmission Mode |
| 6X | Continuous Data Transmission |
| 7X | Master Reset For All Registers and Counter |
| 8X/0X | Single Step Data Transmission By Alternatively Changing Command MSB From "1" to "0" |

Figure 6:
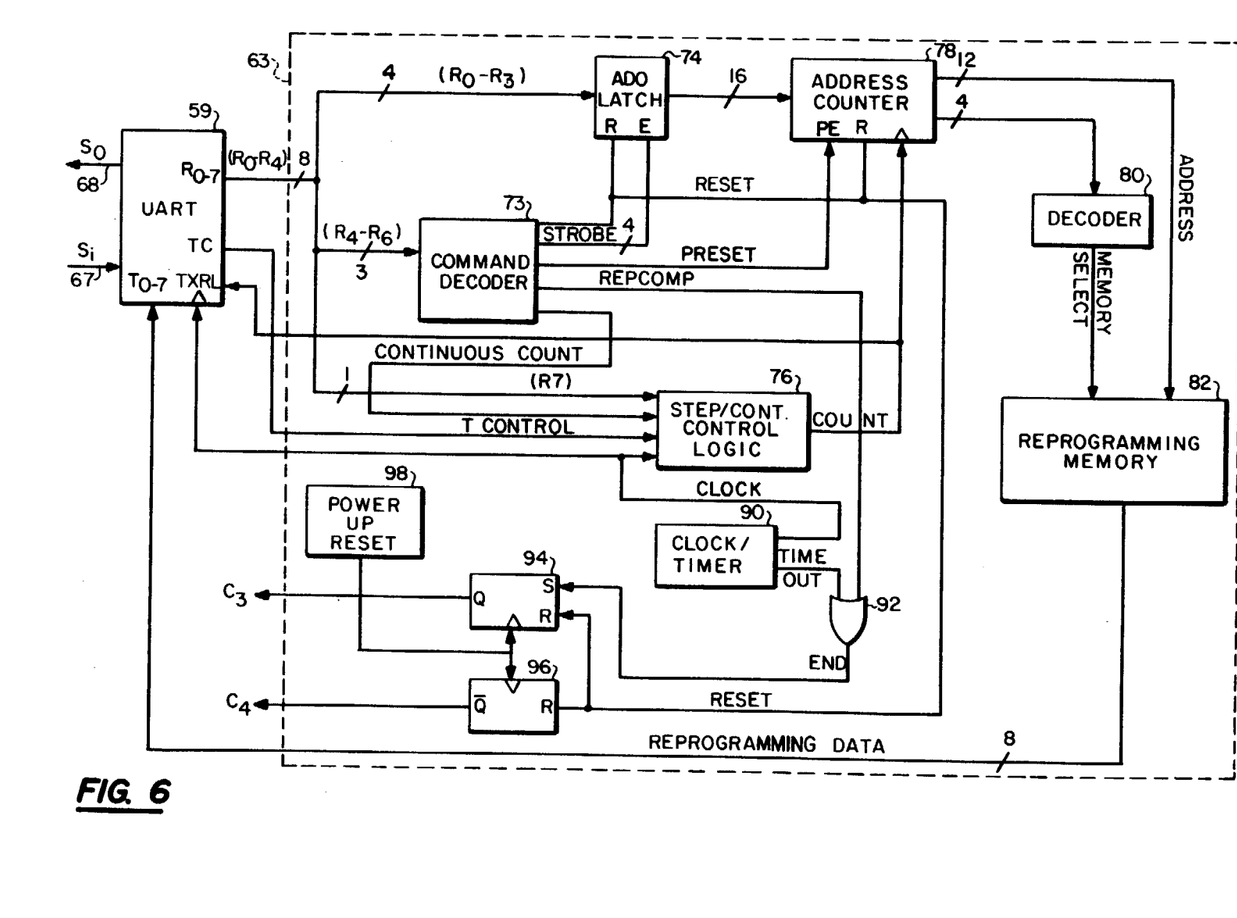
FIG. 6 is a more detailed block diagram of the reprogramming module used in the system of the invention.

The controller 63 that detects and responds to the Table I commands is illustrated in greater detail in FIG. 6 and includes a command decoder 73, an address latch 74, and step/continuous (step/cont) control logic 76. These three units of the controller receive, in parallel format, the commands transmitted from the guidance processor. The UART 59 passes commands to the controller 63 in conventional parallel format. The UART 59 also provides to the controller 63 conventional UART transmit control (TC) signals that differentiate between provision of received command data from a data port R and acceptance of reprogramming data to be serialized and transmitted to the guidance processor through a transmit port T.

Figure 7:
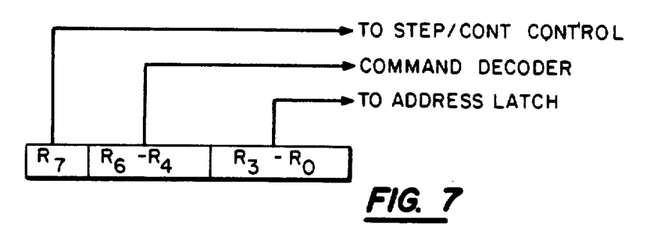
FIG. 7 is an illustration of the format of a command issued by the weapon's processor and used to control a reprogramming data transfer sequence performed by the reprogramming module.

For a better understanding, the command format is illustrated in FIG. 7. Each command has 8 bits, $R_7-R_0$, with $R_7$ the MSB and $R_0$ the LSB. The most significant bit ($R_7$) of a received command is provided to the control logic 76, the next bits ($R_6-R_4$) are provided to the command decoder 73, and the least significant bits ($R_3-R_0$) to the address latch 74.

The decoder 73 responds to the state of the command bits $R_6-R_4$ to provide one of eight internal control signals: STROBE (4 lines), RESET, PRESET, REPCOMP, and CONTINUOUS COUNT. When data is to be transferred byte-by-byte from the reprogramming module to the guidance processor, the control logic 76 responds to a sequence of alternate 1's and 0's in bit $R_7$ of the command by providing a COUNT pulse.

The least significant bits ($R_3-R_0$) of four consecutive commands are strobed into the address latch 74, whence they are transferred to an address counter 78 to preset it to a corresponding address count. The address counter 78 provides a conventional 16-bit address code, the least significant 12 bits of which comprise a memory address (ADDRESS), while the remaining 4 bits constitute a code that is deciphered by a typical decoder 80 to generate a MEMORY SELECT signal.

Both the 12-bit ADDRESS and the decoded MEMORY SELECT signals are provided to a reprogramming memory 82 that includes a plurality of conventional read-only memory (ROM) modules. The ROM modules in the memory 82 contain conventional data entries at locations accessible to the MEMORY SELECT and ADDRESS signals. The stored data constitutes the reprogramming data that is transmitted to the guidance processor during a reprogramming sequence. The MEMORY SELECT signal selects a ROM module, while the ADDRESS signal specifies an address in the selected module.

Conventionally, the reprogramming data is stored in the memory 82 in byte format, so that each addressed location of a selected module provides a byte (8-bits) of reprogramming data that is presented to the port T of the UART 59 for serialization and transmission to the guidance processor.

A conventional digital clock/timer circuit 90 includes timing components, not shown, that provide a conventional digital CLOCK signal that synchronizes the transmit and receive functions of the UART 59 with the operations of the controller 63 and which is fed to the control logic 76 to develop the COUNT signal for the address counter 78. The CLOCK signal is continuously provided through all operational states of the reprogramming system, except one, as explained below. The clock-timer circuit 90 further includes conventionally resettable time-out circuitry that begins to count from a point established by the RESET signal for a predetermined period of time. At the end of the time-out period, the clock/timer circuit 90 provides a TIME-OUT signal.

Both the TIME-OUT and REPCOMP signals are provided to a conventional OR gate 92 to enable a signal (END) indicating either that a reprogramming cycle has ended, or that the time-out period has elapsed.

A pair of conventional flap-flops 94 and 96 are reset by the RESET signal. The flip-flop 94 is additionally set by the END signal. Both flip-flops are set to initial states by the provision of a signal from a power-up reset circuit 98 that provides a single pulse when the power to the reprogramming module is turned on. The outputs of the flip-flops 94 and 96 form the $C_3$ and $C_4$ control signals, respectively, that establish the states of the switches 57 and 61.

Figure 8:
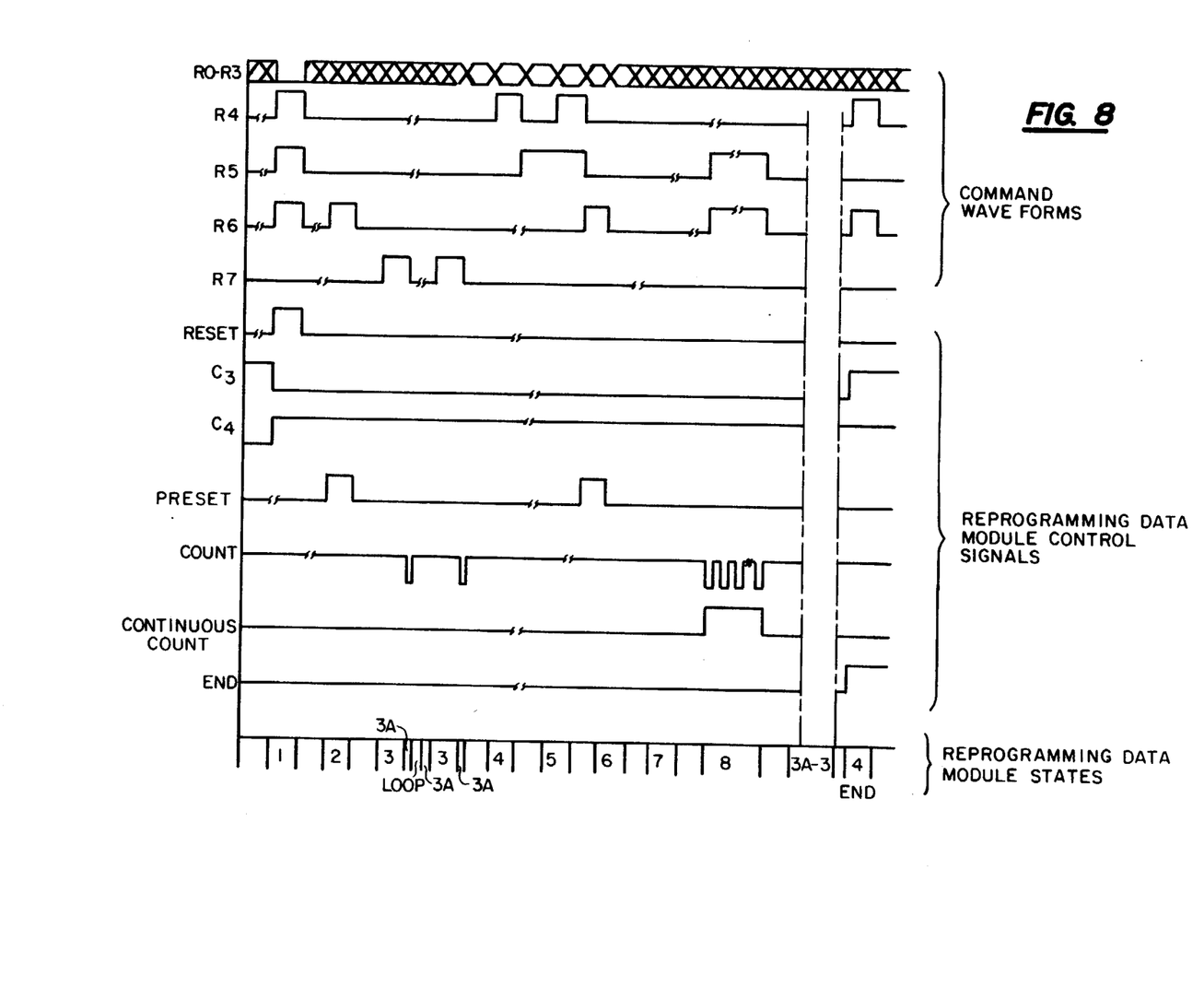
FIG. 8 is a timing diagram illustrating the succession of operations during the reprogramming data transfer sequence performed by the system of the invention.
Figure 9:
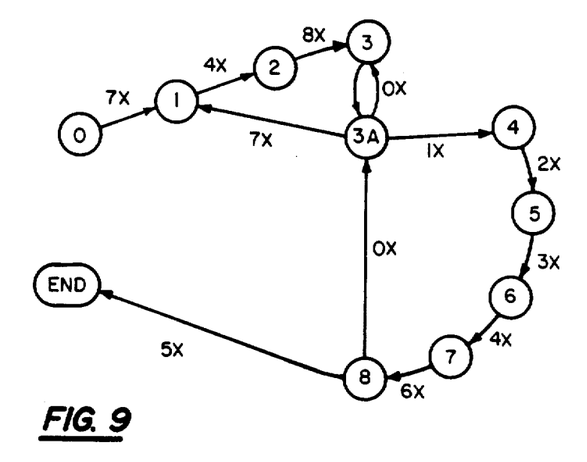
FIG. 9 is a state transition diagram illustrating the flow of operations undertaken by the system of the invention during the reprogramming data transfer sequence of FIG. 8.

The reprogramming sequence operation of the reprogramming data transfer system in response to commands transmitted by the guidance processor can be understood with reference to FIGS. 8-11. FIG. 8 is a waveform diagram illustrating the correspondence between commands received by the reprogramming data module (the waveforms $R_7$-$R_0$) and the internal control signals generated by the module to define its reprogramming sequence state. The states defined by the control signals are indicated beneath the horizontal axis of FIG. 8, and the transition between the states in a reprogramming cycle is shown in the diagram of FIG. 9. The procedure implemented by the guidance processor to stimulate, control, and terminate a reprogramming sequence is embodied in the program flow diagram of FIG. 10.

Prior to a reprogramming sequence, power is applied to the missile electronics and the reprogramming data module. Power-up reset functions in both the missile electronics and the module place the switches 42, 43, 61, and 65 in the states illustrated in FIG. 5A and reset latches, flags, and other storage circuitry to other predetermined states. The guidance processor periodically interrupts its normal operations to determine whether to assert control over the data link comprising the signal lines 29a and 29b. If a reprogramming sequence has previously been completed, the link will not be needed and the processor will resume normal operations (decision block 99 of FIG. 10). If a reprogramming operation has not previously been completed, the positive exit will be followed from block 99 and the settings of the switches 42 and 43 will be changed to those illustrated in FIGS. 4B and 5B. Then, the guidance processor will perform a reprogramming inquiry command sequence consisting, in the preferred embodiment, of the alternate transmission of two differentiable command codes, for example, a 70 command followed by a 77 command. The sequence will be repeated three times, with enough time between each transmission to sample the data link return obtained by the UART 40. If the guidance processor detects the complete sequence, it will terminate the inquiry loop, change the settings of the switches 42 and 43 back to the conditions of FIGS. 4A and 5A and resume normal operations.

Normally the inquiry command sequence will not be interrupted in the case corresponding to FIGS. 4A and 4B; that is, where a reprogramming data module has not been installed in the gripstock. The reprogramming module will also not respond to an inquiry sequence in the event that it has previously completed a reprogramming sequence. In this case, as explained below, the switch 61 will be open, thereby preventing the reprogramming data module from detecting the inquiry sequence.

It should be evident that when the inquiry command sequence has been transmitted under the conditions just described, it will be output serially by the UART 40 on the transmission line 29a and returned to the UART 40 on the transmission line 29b through either the jumper 75 or the jumper 65.

When, however, a reprogramming data module has been installed in the gripstock and has not previously performed a reprogramming sequence, the switches 57 and 61 will be in the states illustrated in FIG. 5B, with the switch 61 providing unidirectional conduction of inquiry command sequence signals from the signal line 29a to the UART 59. This will enable the inquiry commands to be passed to the controller 63, thereby enabling it to respond appropriately by initiating a programming sequence.

Assuming that state 0 of FIGS. 8 and 9 corresponds to the reprogramming module 26 in an initial power-up reset condition and the switches 57 and 61 are in the states illustrated in FIG. 5B, a reset command having the form 77 will place the reprogramming module in state 1, wherein the decoder 73 will decode the command bits $R_6$-$R_4$ to provide the RESET signal to the address latch 74, and the switch control flip-flops 94 and 96. This will reset the latch 74 by fully loading it, and reset the switch control flip-flops 94 and 96 to cause $C_3$ to fall and $C_4$ to rise (state 1 in FIG. 8). This places the switches 57 and 61 in their FIG. 5C conditions, thereby enabling the reprogramming data module 26 to conduct bi-directional data transfer with the terminal unit 27 and the guidance processor. It also opens the pathway between signal line 29a and signal line 67 through the access switch 61. As shown in FIG. 8, $C_4$ remains disabled throughout the remainder of the reprogramming sequence (and after its completion), which keeps the access switch 61 open.

When the state of the switch 57 changes, the inquiry loop commands cannot be returned to the guidance processor. When the inquiry sequence is interrupted, the guidance processor program will follow the positive exit from decision block 100 of FIG. 10, and issue commands appropriate for control of a reprogramming sequence.

Once the inquiry command sequence has been interrupted, the guidance processor will send a final reset 77 command and follow that with a latch command (4X), which sends the reprogramming data module to state 2. In state 2, the 4X command causes the decoder 73 to output the PRESET signal, which causes the full count held in the latch 74 to be transferred into the address counter 78. With a full count, the first COUNT pulse to the counter 78 will send it to a zero count.

Figure 11:
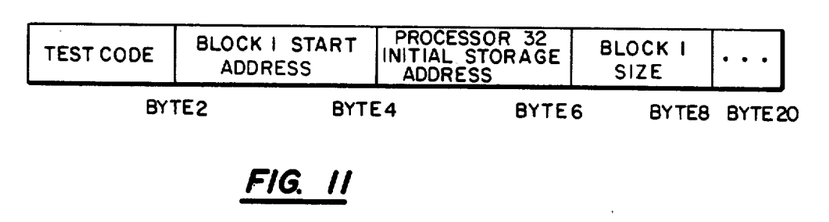
FIG. 11 is a diagram of the structure of a control data block transferred to the processor during a reprogramming data transfer sequence.

Following the 4X command, the guidance processor will obtain a block of control information from the reprogramming data module that is held in the memory 82 beginning at address location 0 (which will be the first address output by the counter 78). The format of the control block is illustrated in FIG. 11 and includes 20 bytes of information. The first 2 bytes include a test code pattern by which the guidance processor recognizes that a proper data link has been established with the reprogramming data module. Following the test code are 2 bytes (byte 2-byte 3) of data that constitute a 16-bit address indicating the beginning address in the reprogramming memory 82 where a first block (block 1) of data intended for transfer to the microprocessor 32 is stored. Following these 2 bytes are 2 more bytes (byte 4-byte 5) that represent a 16-bit address indicating the starting address where the first block of data is to be stored in the memory of processor 32. Finally, bytes 6-7 indicate the size of data block 1. Similarly, the following 6 bytes (byte 8-byte 13) of the control block provide a storage start address, a microprocessor storage address, and a block size for a block of reprogramming information destined for the microprocessor 34. The last 6 bytes define a block storage address, a destination storage address, and a block size for a third block of reprogramming data to be transferred to the microprocessor 36 in the guidance processor.

The control data block is obtained, byte-by-byte, from the reprogramming data module with each byte loaded from the reprogramming module to the guidance processor by means of a repeating command sequence sent by the guidance processor consisting of first an 80 and, next, a 00. Viewed in another way, the guidance processor will toggle the most significant bit ($R_7$) of successive commands, with each positive transition eliciting a COUNT pulse from the control logic 76. The control logic 76 is conventionally designed to provide the COUNT in response to a change of state in $R_7$ under the condition comprising a signal combination including a disabled CONTINUOUS COUNT signal from the decoder 73, TRANSMIT CONTROL signals from the UART 59 indicating an opportunity to transmit reprogramming data provided to the port T, and the first negative CLOCK transition occurring after the command MSB ($R_7$) is positive.

The step transfer of data from the reprogramming data module to the guidance processor is indicated in FIGS. 8 and 9 by a transition from state 2 to state 3 caused by an 80 command, followed by transitions between state 3 and state 3A that are caused by other transitions of the command MSB.

When 20 bytes of control block data have been transferred, the guidance processor evaluates the test code to determine whether or not it is valid. This is illustrated by decision block 102 in FIG. 10. If the test code is invalid, the guidance processor can make a second attempt to obtain valid control data by sending a 7X/4X command sequence, which will take the reprogramming data module to state 2. Then the 80/00 command sequence can be used to transfer the control block a second time.

Figure 10:
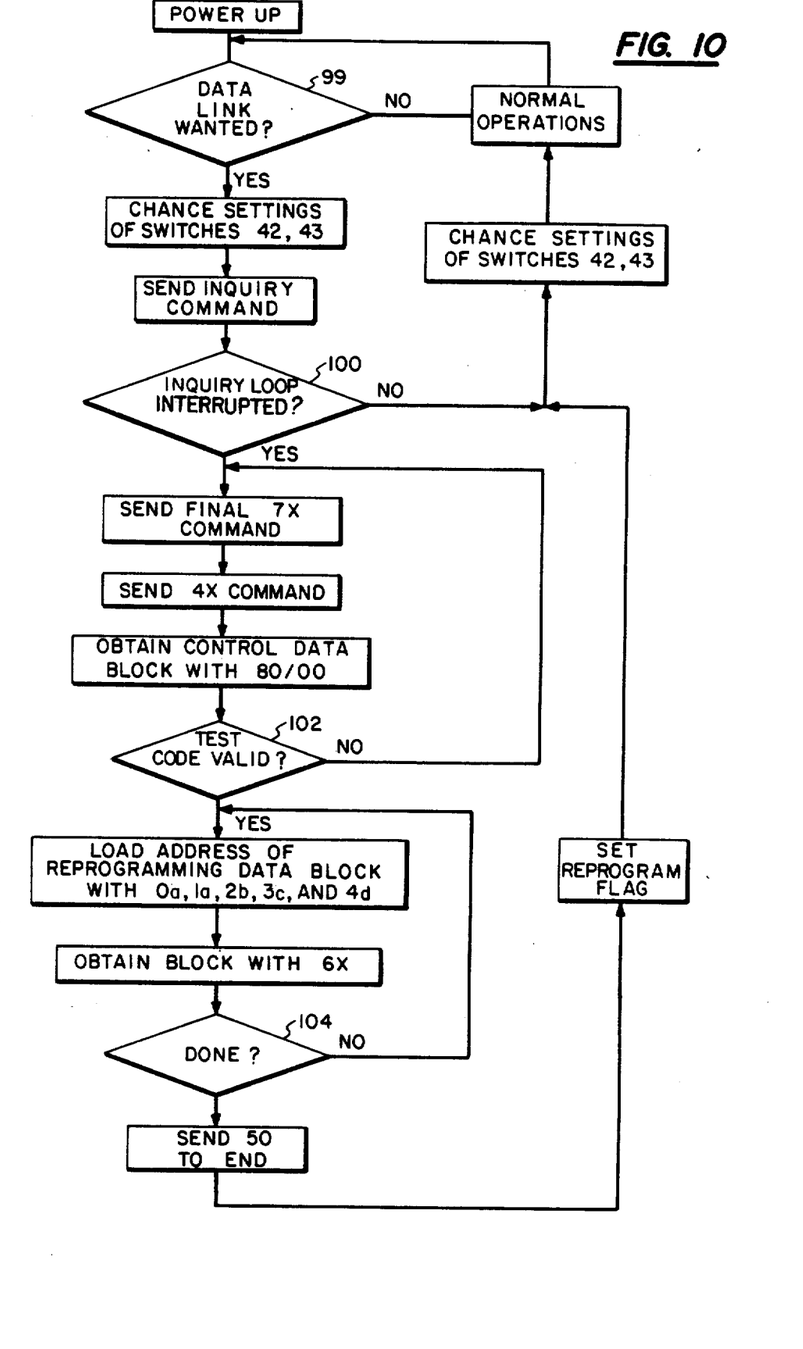
FIG. 10 is a flow diagram illustrating a sequence of reprogramming control operations undertaken by the processor to obtain reprogramming data from the system of the invention.

Assuming that the test code is valid, the guidance processor will follow the positive exit from decision block 102 and load the address of the current reprogramming data block with the command sequence: $1a_1$, $2b_1$, $3c_1$, $4d_1$. This will carry the reprogramming module from state 3A to state 7 through states 4, 5, and 6, respectively. This sequence will cause a sequence of 4 distinct STROBE signals to be provided by the decoder 73 to the address latch 74. Each STROBE will cause the current values of the current command LSB's ($R_0$-$R_3$) to be strobed into the address latch 74. At the end of the STROBE cycle the 16-bit address ($a_1$ $b_1$ $c_1$ $d_1$) defining a data block start address ($a_1$ $b_1$ $c_1$ $d_1$) will have been accumulated in the latch 74 and transferred by the PRESET signal to the address counter 78. At this point, the reprogramming data module is prepared to transfer data continuously in a sequence of bytes beginning at the preset address in the address counter 78. Continuous transfer of data beginning at the entered address will be undertaken by the reprogramming data module for so long as bits $R_5$ and $R_6$ output by the UART 59 are high. Bits $R_5$ and $R_6$ will be high in response to a 6X command transmitted by the guidance processor until a subsequent different command is received. The 6X command causes the decoder 73 to raise the CONTINUOUS COUNT signal which enables the control logic to provide a COUNT signal with each negative transition of the input CLOCK with regard to the condition of the transmit control signals from the UART 59. The COUNT signal is fed in phase to the address counter and to the TXRL (transmit register load) part of the UART 59. Each COUNT pulse changes the address; each new address provides a byte of reprogramming data to port $T_{0-7}$ of the UART 59; and the COUNT pulse notifies the UART 59 to acquire the byte for serialization and transmission.

The guidance processor counts the bytes in the reprogramming block until the correct number (based upon the block size) have been transferred. Then, if another block is to be transferred, the guidance processor will transmit the following command sequence: $0a_2$, $1a_2$, $2b_2$, $3c_2$, $4d_2$, and 6X. This will carry the reprogramming data module back to state 8 where continuous transfer of the next block of reprogramming data starting at address ($a_2$ $b_2$ $c_2$ $d_2$) is obtained.

When all of the reprogramming blocks have been transferred, the reprogramming sequence will have been completed and the guidance processor will take the positive exit from decision block 104, send a 5X command to the reprogramming data module, set a flag indicating that reprogramming has been successfully completed, change the settings of switches 42 and 43, and resume its normal operations.

The 5X command will place the reprogramming data module in its final state (END) in which the decoder 73 will raise the RECOMP signal. The REPCOMP signal will enable the gate 92 to raise the END signal to a positive level, which will disable the timer 90 and disable $C_3$. With $C_3$ disabled, the switch 57 will go back to the condition illustrated in FIG. 5A and the reprogramming sequence will be complete.

The END signal can also be generated by the clock/timer 90. In state 1, the power-up sequence starts the TIME-OUT period of the clock/timer 90 running. The TIME-OUT period establishes the maximum time allowed for completion of a reprogramming sequence. When the TIME-OUT period ends, the TIME-OUT signal changes state, which enables the gate 92 to raise the END signal. The END signal blocks the CLOCK signal from the UART 59 and from the control logic 76. The END signal also causes the control signal $C_3$ to change state, which places the switch 57 in a configuration illustrated in FIG. 5A. This prevents the reprogramming data module responding to further commands from the guidance processor and, therefore terminates further data transfer to the guidance processor.

Further, the END signal, in disabling the reprogramming data module from responding to commands, also causes the termination of reprogramming operations in the guidance processor. Although not illustrated in FIG. 10, the guidance processor reprogramming control process will terminate reprogramming operation and return to normal ones if no data is received from the reprogramming data module 26 within a certain period of time.

Obviously, many modifications and variations of the present invention are possible in light of the above teachings. It is therefore to be understood that within the scope of the appended claims, the invention may be practiced otherwise than as specifically described.

We claim:

1. A system for transferring reprogramming data to a self-programmable, command-producing processor that is contained in an electronic module having a plurality of signal paths for conducting signals between the interior and exterior of the electronic module, comprising:
    terminal means in said electronic module and connected to one of a plurality of signal paths that conduct signals between the interior and exterior of said electronic module;
    connecting means in said terminal means responsive to a self-programmable, command-producing processor contained in said electronic module for connecting said processor to said one of said signal paths;
    a reprogramming data module positioned outside said electronic module adjacent an electronic module signal path to which said terminal means is connected;
    an access means in said reprogramming data module for unidirectionally conducting signals from said electronic module signal path;
    data transfer means in said reprogramming data module and connected to said access means for detecting reprogramming command signals on said electronic module signal path and for decoding said reprogramming command signals to provide plural reprogramming control signals;
    switching means in said reprogramming data module responsive to a first one of said reprogramming control signals decoded from an inquiry reprogramming command signal for connecting said data transfer means to said electronic module signal path; and
    reprogramming data storage means in said data transfer means responsive to other reprogramming control signals for providing reprogramming data signals to said electronic module signal path.

2. The system of claim 1 wherein said one signal path is for conducting an analog function signal when not connected to said processor.

3. The system of claim 2 further including means in said terminal means for providing an alternate signal path for said function signal when said processor is connected to said one signal path.

4. The system of claim 1 wherein said data transfer means responds to a predetermined sequence of reprogramming commands to conduct a reprogramming data transfer sequence in which said reprogramming data signals are provided to said electronic module signal path.

5. The system of claim 4 wherein said data transfer means responds to a return command in said reprogramming command sequence by operating said switching means to disconnect said data transfer means from said electronic module signal path.

6. The system of claim 4 further including means in said data transfer means for terminating said reprogramming data transfer sequence after the elapse of a predetermined amount of time.

7. An apparatus for providing data to amend a program in a self-programmable, command-producing processor contained in an electronic module having a plurality of active signal paths for conducting signals between said electronic module and another device, comprising:
    access means switchably connected to a signal path that conducts a function signal to the exterior of an electronic module containing a self-programmable, command-producing processor which is connected to said signal path, for unidirectionally conducting signals from said signal path;
    control means connected to receive said unidirectionally conducted signals for producing a switch command signal in response to an inquiry command signal;
    signal path switching means connected between said signal path and said control means for assuming a first state connecting said signal path to said control means in response to said switch control signals; and
    program transfer means included in said control means and responsive to reprogramming commands received on said signal path for providing program amendment information for said processor on said signal path after said switching means has assumed said first state.

8. The system of claim 7 wherein said function signal is an analog function signal.

9. The system of claim 8 wherein said reprogramming commands and said program amendment information comprise digital signals.

10. The system of claim 7 wherein, after transferring predetermined program amendment information, said control means is responsive to a return command signal on said signal path for changing said switch command signal, and said signal path switching means assumes a second state disconnecting said control means from said signal path in response to said switch command signal change.

11. The system of claim 7 wherein said control means responds to a predetermined sequence of reprogramming commands on said signal path by performing a reprogramming sequence of operations in which said program amendment information is provided on said signal path.

12. The system of claim 11 further including means in said control means for terminating said sequence of operations after a predetermined amount of time from the beginning of said sequence of operations.

13. A method of altering the program of a command-producing processor contained in an electronic module, comprising the steps of:
    monitoring a function signal path connected to an electronic module containing a command-producing processor for the presence of a processor-produced reprogramming inquiry command in the signals on said signal path;
    in response to the occurrence of an inquiry command on said signal path, connecting to said signal path a reprogramming data module including means responsive to predetermined command signals for producing data signals to reprogram said processor;
    providing a series of reprogramming commands to said reprogramming data module from said processor on said signal path; and
    providing, in response to said reprogramming command series, reprogramming data signals from said reprogramming data module on said signal path.

14. The method of claim 13 further including, after the provision of said reprogramming data signals, providing to said reprogramming data module a command signal to end said reprogramming data signals, and ending said reprogramming data signals in response to said end command signal.

15. The method of claim 14 further including disconnecting said reprogramming data module from said signal path in response to said end command signal.

16. The method of claim 13 further including providing an alternate signal path for conducting said function signal while said reprogramming data module is connected to said signal path.

17. The method of claim 15 further including providing an alternate signal path for conducting said function signal while said reprogramming data module is connected to said signal path.

18. The method of claim 17 further including restoring said function signal to said signal path when said reprogramming data module is disconnected therefrom.

19. A data link for selectably connecting a pair of modules, comprising:
    a signal path for conducting predetermined function signals between the interior and exterior of a first module containing a processor that produces control and command signals;
    a first switching unit contained in said first module and responsive to a first control signal for connecting said processor to said signal path for bi-directional signal transfer thereon;
    function switching means in said first switching unit that respond to a second control signal for providing an alternate signal path for conduction of said function signals when said processor is connected to said signal path; and
    a second switching unit contained in a second module and responsive to a command signal on said signal path for providing said second module bi-directional signal transfer access to said signal path.

20. A system for transferring reprogramming data, comprising:
    an electronic module having a plurality of signal paths for conducting signals between the interior and exterior of said electronic module;
    a self-programmable, command-producing processor in said electronic module;
    a terminal means in said electronic module and responsive to said processor for connecting and disconnecting said processor and one of said signal paths;
    a reprogramming data module for being positioned outside said electronic module adjacent said one signal path;
    access means in said reprogramming data module for unidirectionally conducting signals from said one signal path;
    data transfer means in said reprogramming data module and connected to said access means for detecting reprogramming command signals on said one signal path and for decoding said reprogramming command signals to provide plural reprogramming control signals;
    switching means in said reprogramming data module responsive to one of said reprogramming control signals decoded from an inquiry reprogramming command signal for connecting said data transfer means to said one signal path; and
    reprogramming data storage means in said data transfer means responsive to other reprogramming control signals for providing reprogramming data signals to said one signal path.

21. The system of claim 20 wherein said one signal path is for conducting an analog function signal when not connected to said processor.

22. The system of claim 21 further including means in said terminal means for providing an alternate signal path for said function signal when said processor is connected to said one signal path.

23. The system of claim 20 wherein said data transfer means responds to a predetermined sequence of reprogramming commands to conduct a reprogramming data transfer sequence in which said reprogramming data signals are provided to said one signal path.

24. The system of claim 23 wherein said data transfer means responds to a return command in said reprogramming command sequence by operating said switching means to disconnect said data transfer means from said one signal path.

25. The system of claim 23 further including means in said data transfer means for terminating said reprogramming data transfer sequence after a predetermined amount of time from the beginning of said reprogramming data transfer sequence.

* * * * *

(12) EX PARTE REEXAMINATION CERTIFICATE (5046th)
United States Patent
Hui et al.

(10) Number: US 4,660,170 C1
(45) Certificate Issued: Dec. 28, 2004

(54) SYSTEM FOR PROVIDING REPROGRAMMING DATA TO AN EMBEDDED PROCESSOR

(75) Inventors: Kenneth H. Hui, Duarte, CA (US); King C. Mak, Alhambra, CA (US); David G. Hardesty, San Dimas, CA (US)

(73) Assignee: Hughes Missile Systems Company, Canoga Park, CA (US)

Reexamination Request:
No. 90/005,619, Jan. 24, 2000

Reexamination Certificate for:
Patent No.: 4,660,170
Issued: Apr. 21, 1987
Appl. No.: 06/728,621
Filed: Apr. 29, 1985

(51) Int. Cl.⁷ ............................ G06F 13/00; G06F 15/00
(52) U.S. Cl. ............................ 710/316; 710/108; 712/37
(58) Field of Search ................................ 710/100, 317, 710/3, 316, 108; 712/37; 714/55; 709/107

(56) References Cited

U.S. PATENT DOCUMENTS

| | | | | |
|---|---|---|---|---|
| 3,478,322 A | | 11/1969 | Evans ......................... | 712/248 |
| 3,573,852 A | * | 4/1971 | Watson et al. ............... | 709/107 |
| 3,641,505 A | * | 2/1972 | Artz et al. .................... | 710/100 |
| 3,683,415 A | | 8/1972 | Lloyd et al. | |
| 3,879,713 A | | 4/1975 | Bettin et al. | |
| 3,944,984 A | | 3/1976 | Morley et al. | |
| 3,972,025 A | | 7/1976 | Taddei ............................ | 711/2 |
| 3,984,819 A | * | 10/1976 | Anderson ..................... | 710/317 |
| 4,063,311 A | | 12/1977 | Jeremiah et al. | |
| 4,152,770 A | | 5/1979 | Olander, Jr. et al. | |
| 4,179,735 A | | 12/1979 | Lodi .......................... | 713/100 |

(List continued on next page.)

FOREIGN PATENT DOCUMENTS

| | | |
|---|---|---|
| EP | 0073419 | 3/1983 |
| EP | 0127002 | 5/1984 |
| EP | 137737 B1 | 5/1991 |
| GB | 2031614 A | 4/1980 |
| GB | 2054909 A | 2/1981 |
| JP | 58172704 A | 10/1983 |

OTHER PUBLICATIONS

1980 IEEE Paper "A Microprocessor—Based Two Wire Duplex Synchronous Data Set" Library of Congress Catalog Card No. 80–80156.

IEE Proceedings–E, vol. 128, Part E, No. 1, Jan. 1981, pp. 1–6, D. Ibrahim, 16–Bit Microprogrammable Microcomputer With Writable Control Store.

European Search Report dated Mar. 27, 1984 in regards to EP application No. EP 82107560.

*Primary Examiner*—P Winder (57) ABSTRACT

A system for providing information to alter the software of an electronic data processor embedded in an electronic module includes a remote reprogramming module that conducts a sequence of operations to provide data to the processor which the processor uses to reprogram itself. The system employs a data link having a bi-directional transmission path connecting the processor and the reprogramming module. A controlled switching circuit is provided at each end of the transmission path. Under normal operating conditions, the transmission path is used to transit a function signal for a function performed by the electronic module. Periodically, the processor operates one switching network to capture the path for transmission of a reprogramming inquiry signal to the reprogramming module. At the same time, the function signal is diverted to an alternate path internal to the electronic module. When the reprogramming module detects a reprogramming inquiry, it operates the other switching circuit to gain access to the transmission path. Then, in response to commands from the processor, the reprogramming module undertakes the reprogramming sequence and transfers data to alter program information held in the memory of the processor. Thereafter, both the processor and the reprogramming module operate their respective switching circuits to restore the transmission path to its normal operational use for the transmission of the function signal.

U.S. PATENT DOCUMENTS

| | | |
|---|---|---|
| 4,204,252 A | 5/1980 | Hitz et al. .................. 712/248 |
| 4,216,463 A | 8/1980 | Backof et al. |
| 4,263,670 A | 4/1981 | Sherman |
| 4,388,697 A | 6/1983 | Breen et al. |
| 4,399,523 A | 8/1983 | Gerber et al. |
| 4,408,328 A * | 10/1983 | Wakai ......................... 714/55 |
| 4,450,521 A * | 5/1984 | McDonough et al. .......... 710/3 |
| 4,680,731 A | 7/1987 | Izumi et al. |
| 4,718,037 A * | 1/1988 | Thaden ....................... 712/37 |

\* cited by examiner

US 4,660,170 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-3, 16-17 and 21-22 are cancelled.

Claims 1, 4-5, 7, 13, 18-19 and 20 are determined to be patentable as amended.

Claims 6, 8-12, 14-15 and 23-25, dependent on an amended claim, are determined to be patentable.

New claims 26-28 are added and determined to be patentable.

1. A system for transferring reprogramming data to a self-programmable, command-producing processor that is contained in an electronic module having a plurality of signal paths for conducting signals between the interior and exterior of the electronic module, comprising:
  terminal means in said electronic module and connected to one of a plurality of signal paths that conduct signals between the interior and exterior of said electronic module;
  connecting means in said terminal means responsive to a self-programmable, command-producing processor contained in said electronic module for connecting said processor to said one of said signal paths, *wherein said one of said signal paths is for conducting a function signal when not connected to said processor*;
  a reprogramming data module positioned outside said electronic module adjacent [an electronic module] *to said one of said signal paths* to which said terminal means is connected;
  an access means in said reprogramming data module for unidirectionally conducting signals from said [electronic module signal path] *one of said signal paths*;
  data transfer means in said reprogramming data module and connected to said access means for detecting reprogramming command signals on said [electronic module] *one of said signal paths* and for decoding said reprogramming command signals to provide plural reprogramming control signals;
  switching means in said reprogramming data module responsive to a first one of said reprogramming control signals decoded from an inquiry reprogramming command signal for connecting said data transfer means to said [electronic module] *one of said* signal paths; [and]
  reprogramming data storage means in said data transfer means responsive to other reprogramming control signals for providing reprogramming data signals to said [electronic module] *one of said* signal paths; *and*
  *means in said terminal means for re-routing said function signal from said one of said signal paths when said processor is connected to said one signal path without interrupting conduction of said function signal.*

4. The system of claim 1 wherein said data transfer means responds to a predetermined sequence of reprogramming commands to conduct a reprogramming data transfer sequence in which said reprogramming data signals are provided to said [electronic module] *one of said* signal paths.

5. The system of claim 4 wherein said data transfer means responds to a return command in said reprogramming command sequence by operating said switching means to disconnect said data transfer means from said [electronic module] *one of said* signal paths.

7. An apparatus for providing data to amend a program in a self-programmable, command-producing processor contained in an electronic module having a plurality of active signal paths for conducting signals between said electronic module and another device, comprising:
  access means switchably connected to a signal path that conducts a function signal to the exterior of an electronic module containing a self-programmable, command-producing processor which is connected to said signal path, for unidirectionally conducting signals from said signal path;
  control means connected to receive said unidirectionally conducted signals for producing a switch command signal in response to an inquiry command signal;
  signal path switching means connected between said signal path and said control means for assuming a first state connecting said signal path to said control means in response to said switch control signals *when said function signal is transmitted on said signal path and assuming a second state disconnecting said control means from said signal path when said function signals are re-routed through an alternate signal path and reprogramming signals are transmitted on said signal path*; and
  program transfer means included in said control means and responsive to said reprogramming commands received on said signal path for providing program amendment information for said processor on said signal path after said switching means has assumed said first state.

13. A method of altering the program of a command-producing processor contained in an electronic module, comprising the steps of:
  *providing a function signal on a signal path connected to an electronic module containing a command-producing processor;*
  monitoring [a] *said* function signal path [connected to an electronic module containing a command-producing processor] for the presence of a processor-produced reprogramming inquiry command in the signals on said signal path;
  in response to the occurrence of an inquiry command on said signal path, connecting to said signal path a reprogramming data module including means responsive to predetermined command signals for producing data signals to reprogram said processor;
  providing a series of reprogramming commands to said reprogramming data module from said processor on said signal path; [and]
  providing, in response to said reprogramming command series, reprogramming data signals from said reprogramming data module on said signal path; *and*
  *re-routing said function signal from said signal path without interrupting conduction of said function signal*

*when said reprogramming data module is connected to said signal path.*

18. The method of claim [17] *13* further including restoring said function signal to said signal path when said reprogramming data module is disconnected therefrom.

19. A data link for selectably connecting a pair of modules, comprising:

a signal path for conducting predetermined function signals between the interior and exterior of a first module containing a processor that produces control and command signals;

a first switching unit contained in said first module and responsive to a first control signal for connecting said processor to said signal path for bi-directional signal transfer *of reprogramming signals* thereon;

function switching means in said first switching unit that respond to a second control signal for [providing] *re-routing said function signals from said signal path through* an alternate signal path [for] *without interrupting* conduction of said function signals when said processor is connected to said signal path *for transfer of said reprogramming signals*; and a second switching unit contained in a second module and responsive to a command signal on said signal path for providing said second module bi-directional signal transfer access to said signal path.

20. A system for transferring reprogramming data, comprising:

an electronic module having a plurality of signal paths for conducting signals between the interior and exterior of said electronic module;

a self-programmable, command-producing processor in said electronic module;

a terminal means in said electronic module and responsive to said processor for connecting and disconnecting said processor and one of said signal paths;

a reprogramming data module for being positioned outside said electronic module adjacent said one signal path;

access means in said reprogramming data module for unidirectionally conducting signals from said one signal path;

data transfer means in said reprogramming data module and connected to said access means for detecting reprogramming command signals on said one signal path and for decoding said reprogramming command signals to provide plural reprogramming control signals;

switching means in said reprogramming data module responsive to one of said reprogramming control signals decoded from an inquiry reprogramming command signal for connecting said data transfer means to said one signal path; [and]

reprogramming data storage means in said data transfer means responsive to other reprogramming control signals for providing reprogrammind data signals to said one signal path, *wherein said one signal path is for conducting a function signal when not connected to said processor; and*

*means in said terminal means for re-routing said function signal through an alternate signal path when said processor is connected to said one signal path without interrupting the conduction of said function signal.*

*26. The system of claim 1, wherein the switching means in the reprogramming data module disconnects the data transfer means from the electronic module signal path.*

*27. The system of claim 26, wherein the switching means provides a return path for the function signals to the processor in the electronic module.*

*28. The apparatus of claim 7, wherein the signal path switching means assumes a second state in which it disconnects the signal path from the control means and the control means issues a switch control signal to the access means when the signal path switching means is in its second state which places the access means in a state in which the unidirectionally conducting signals are not provided to the control means.*

\* \* \* \* \*